United States Patent [19]

Kun

[11] Patent Number: 4,835,685
[45] Date of Patent: May 30, 1989

[54] VIRTUAL SINGLE MACHINE WITH MESSAGE-LIKE HARDWARE INTERRUPTS AND PROCESSOR EXCEPTIONS

[75] Inventor: Andrew I. Kun, Willowdale, Canada

[73] Assignee: Computer X, Inc., Schaumburg, Ill.

[21] Appl. No.: 730,922

[22] Filed: May 6, 1985

[51] Int. Cl.⁴ .............................................. G06F 1/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,325,120 | 4/1982 | Colley et al. | 364/200 |
| 4,394,725 | 7/1983 | Bienvenu et al. | 364/200 |
| 4,475,156 | 10/1984 | Federico et al. | 364/300 |
| 4,631,674 | 12/1986 | Blandy | 364/300 |
| 4,649,479 | 3/1987 | Advani et al. | 364/300 |

Primary Examiner—Gareth D. Shaw
Assistant Examiner—Rebecca L. Adams
Attorney, Agent, or Firm—Walter W. Nielsen

[57] ABSTRACT

A multi-processor, multi-tasking virtual machine comprises processes, messages, and contexts. Processes communicate only through messages. Contexts are groups of related processes.

The virtual machine makes all hardware devices appear to be processes, in that the occurrence of an event on a device causes a message to be generated and sent to another process for handling. The receiving process performs all operations required to handle the event. Thus a variety of hardware devices can be connected and disconnected from the system without interrupting its operation and without necessitating extensive software revisions.

8 Claims, 6 Drawing Sheets

VIRTUAL SINGLE MACHINE WITH MESSAGE-LIKE HARDWARE INTERRUPTS AND PROCESSOR EXCEPTIONS

RELATED INVENTIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention is related to the following inventions, filed on even date herewith, all assigned to the assignee of the present invention:

1. Title: Nested Contexts in a Virtual Single Machine
   Inventors: Andrew Kun, Frank Kolnick, and Bruce Mansfield
   Ser. No. 730,903
2. Title: Computer System With Data Residency Transparency and Data Access Transparency
   Inventors: Bruce Mansfield, Andrew Kun, and Frank Kolnick
   Ser. No. 730,929 (now abandoned) and Ser. No. 110,614 (continuation filed 10/19/87)
3. Title: Network Interface Module With Minimized Data Paths
   Inventors: Bernard Weisshaar and Michael Barnea
   Ser. No. 730,621, now U.S. Pat. No. 4,754,395
4. Title: Method of Inter-Process Communication in a Distributed Data Processing System
   Inventors: Bernard Weisshaar, Frank Kolnick, Andrew Kun, and Bruce Mansfield
   Ser. No. 730,892, now U.S. Pat. No. 4,694,396
5. Title: Logical Ring in a Virtual Single Machine
   Inventors: Andrew Kun, Frank Kolnick, and Bruce Mansfield
   Ser. No. 730,923 (now abandoned) and Ser. No. 183,469 (continuation filed 4/15/88)

TECHNICAL FIELD

This invention relates generally to digital data processing, and, in particular, to an operating system which handles external hardware interrupts and processor exceptions as if they were messages received from respective processes.

BACKGROUND OF THE INVENTION

The present invention is implemented in a distributed data processing system—that is, two or more data processing systems which are capable of functioning independently but which are so coupled as to send and receive messages to and from one another.

A Local Area Network (LAN) is an example of a distributed data processing system. A typical LAN comprises a number of autonomous data processing "cells", each comprising at least a processor and memory. Each cell is capable of conducting data processing operations independently. In addition, each cell is coupled (by appropriate means such as a twisted wire pair, coaxial cable, fiber optic cable, etc.) to a network of other cells which may be, for example, a loop, star, tree, etc., depending upon the design considerations.

As mentioned above, the present invention finds utility in such a distributed data processing system, since there is a significant need in such a system for a relatively great degree of hardware independence. Typical distributed data processing systems comprise a large variety of diverse processors, memories, operator interfaces, printers, and other peripherals. Thus there is an urgent need to provide an operating system for such a distributed data processing system, which operating system will easily accommodate different types of hardware devices without the necessity of writing and/or rewriting large portions of such operating system each time a device is added or removed from the system.

A "process", as used within the present invention, is defined as a self-contained package of data and executable procedures which operate on that data, comparable to a "task" in other known systems. Within the present invention a process can be thought of as comparable to a subroutine in terms of size, complexity, and the way it is used. The difference between processes and subroutines is that processes can be created and destroyed dynamically and can execute concurrently with their creator and other "subroutines".

Within a process, as used in the present invention, the data is totally private and cannot be accessed from the outside, i.e., by other processes. Processes can therefore by used to implement "objects", "modules", or other higher-level data abstractions. Each process executes sequentially. Concurrency is achieved through multiple processes, possibly executing on multiple processors.

Every process in the distributed data processing system of the present invention has a unique identifier (PID) by which it can be referenced. The PID is assigned by the system when the process is created, and it is used by the system to physically locate the process.

Every process also has a non-unique, symbolic "name", which is a variable-length string of characters. In general, the name of a process is known system-wide. To restrict the scope of names, the present invention utilizes the concept of a "context".

A "context" is simply a collection of related processes whose names are not known outside of the context. Contexts partition the name space into smaller, more manageable subsystems. They also "hide" names, ensuring that processes contained in them do not unintentionally conflict with those in other contexts.

A process in one context cannot explicitly communicate with, and does not know about, processes inside other contexts. All interaction across context boundaries must be through a "context process", thus providing a degree of security. The context process often acts as a switchboard for incoming messages, rerouting them to the appropriate sub-processes in its context.

A context process behaves like any other process and additionally has the property that any processes which it creates are known only to itself and to each other. Creation of the process constitutes definition of a new context with the same name as the process.

Any process can create context processes. Each new context thus defined is completely contained inside the context in which it was created and therefore is shielded from outside reference. This "nesting" allows the name space to be structured hierarchically to any desired depth.

Conceptually, the highest level in the hierarchy is the system itself, which encompasses all contexts. Nesting is used in top-down design to break a system into components or "layers", where each layer is more detailed than the preceding one. This is analogous to breaking a task down into subroutines, and in fact many applications which are single tasks on known systems may translate to multiple processes in nested contexts.

A "message" is a buffer containing data which tells a process what to do and/or supplies it with information it needs to carry out its operation. Each message buffer can have a different length (up to 64 kilobytes). By convention, the first field in the message buffer defines the type of message (e.g., "read", "print", "status", "event", etc.).

Messages are queued from one process to another by name or PID. Queuing avoids potential synchronization problems and is used instead of semaphores, monitors, etc. The sender of a message is free to continue after the message is sent. When the receiver attempts to get a message, it will be suspended until one arrives if none are already waiting in its queue. Optionally, the sender can specify that it wants to wait for a reply and is suspended until that specific message arrives. Messages from any other source are not dequeued until after that happens.

Within the present invention, messages are the only way for two processes to exchange data. There is no concept of a "global variable". Shared memory areas are not allowed, other than through processes which essentially "manage" each area by means of messages. Messages are also the only form of dynamic memory that the system handles. A request to allocate memory therefore returns a block of memory which can be used locally by the process but can also be transmitted to another process.

Messages provide the mechanism by which hardware transparency is achieved. A process located anywhere in the system may send a message to any other process anywhere else in the system (even on another processor) if it knows the process name. This means that processes can be dynamically distributed across the system at any time to gain optimal throughput without changing the processes which reference them. Resolution of destinations is done by searching the process name space.

The context nesting level determines the "scope of reference" when sending messages between processes by name. From a given process, a message may be sent to all processes at its own level (i.e., in the same context) and (optionally) to any arbitrary higher level. The contexts are searched from the current context upward until a match is found. All processes with the given name at that level are then sent a copy of the message. A process may also send a message to itself or to its parent (the context process) without knowing either name explicitly, permitting multiple instances of a process to exist in different contexts, with different names.

Sending messages by PID obviates the need for a name search and ignores context boundaries. This is the most efficient method of communicating.

There is a significant need to be able to provide within a data processing operating system the ability to easily handle a wide variety of external device interrupts, processor exceptions, etc. While it is known to provide the capability of servicing hardware interrupts in a data processing system, it is presently not known in such a system to regard all external devices as processes, and to regard the interrupts, exceptions, and traps which they generate as if they were messages originating from their respective processes.

BRIEF SUMMARY OF INVENTION

Accordingly, it is an object of the present invention to provide a data processing system having an improved operating system.

It is also an object of the present invention to provide an improved data processing system having an operating system which easily handles hardware interrupts and exceptions originating from a variety of different hardware devices.

It is another object of the present invention to provide an improved data processing system having an operating system which regards hardware interrupts and exceptions as messages originating from processes.

These and other objects are achieved in accordance with a preferred embodiment of the invention by providing a method of handling interrupts in a data processing system comprising a processor, a memory store, and at least one process resident in the memory store, the method comprising the steps of generating a interrupt message upon the occurrence of an event within the system; transmitting the message to the process; and using the process to control all operations required to be performed to service the interrupt message.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

OVERVIEW OF COMPUTER SYSTEM

Figure 1:
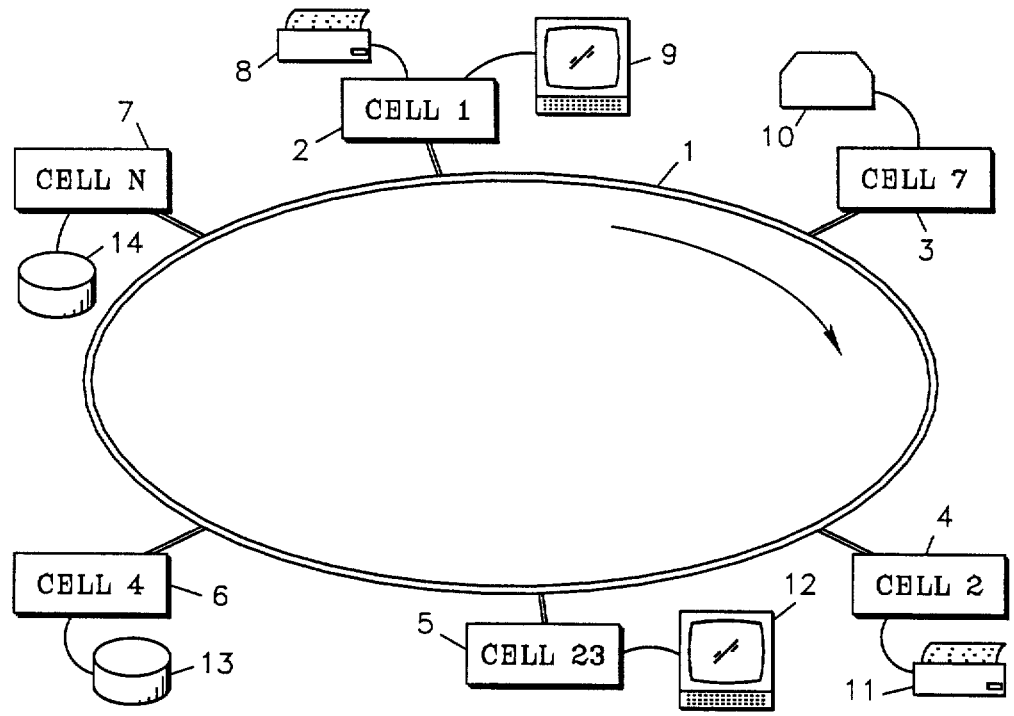
FIG. 1 shows a representational illustration of a single network, distributed data processing system incorporating the improved data management system of the present invention.

With reference to FIG. 1, a distributed computer configuration is shown comprising multiple cells 2-7

(nodes) loosely coupled by a local area network (LAN) 1. The number of cells which may be connected to the network is arbitrary and depends upon the user application. Each cell comprises at least a processor and memory, as will be discussed in greater detail with reference to FIG. 2 below. In addition, each cell may also include other units, such as a printer 8, operator display module (ODM) 9, mass memory module 13, and other I/O device 10.

Figure 2:
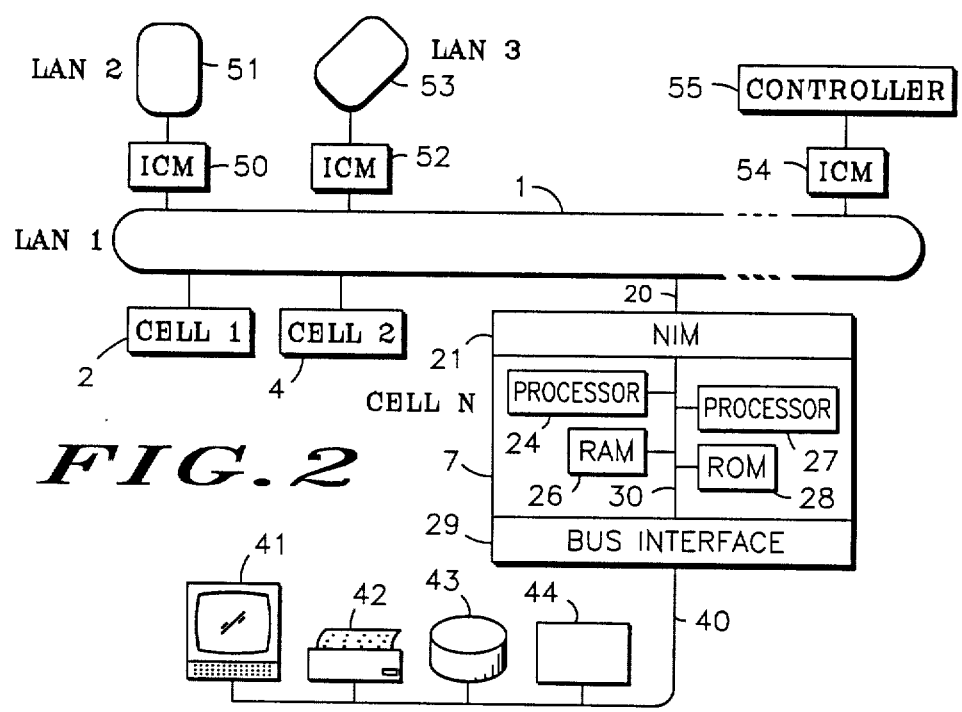
FIG. 2 shows a block diagram illustrating a multiple-network, distributed data processing system incorporating the improved data management system of the present invention.

With reference now to FIG. 2, a multiple-network distributed computer configuration is shown. A first local area network LAN 1 comprises several cells 2,4,and 7. LAN 1 is coupled to a second local area network LAN 2 by means of an Intelligent Communications Module (ICM) 50. The Intelligent Communications Module provides a link between the LAN and other networks and/or remote processors (such as programmable controllers).

LAN 2 may comprise several cells (not shown) and may operate under the same LAN protocol as that of the present invention, or it may operate under any of several commercially available protocols, such as Ethernet; MAP, the Manufacturing Automation Protocol of General Motors Corp.; Systems Network Architecture (SNA) of International Business Machines, Inc.; SECS-II; etc. Each ICM 50 is programmable for carrying out one of the above-mentioned specific protocols. In addition, the basic processing module of the cell itself can be used as an intelligent peripheral controller (IPC) for specialized devices.

LAN 1 is additionally coupled to a third local area network LAN 3 via ICM 52. A process controller 55 is also coupled to LAN 1 via ICM 54.

A representative cell N (7, FIG. 2) comprises a processor 24 which, in a preferred embodiment, is a Motorola 68010 processor. Each cell further includes a read only memory (ROM) 28 and a random access memory (RAM) 26. In addition, each cell includes a Network Interface Module (NIM) 21, which connects the cell to the LAN, and a Bus Interface 29, which couples the cell to additional devices within a cell. While a minimal cell is capable of supporting two peripheral devices, such as an Operator Display Module (ODM) 41 and an I/O Module 44, additional devices (including additional processors, such as processor 27) can be provided within a cell. Other additional devices may comprise, for example, a printer 42, and a mass-storage module 43 which supports a hard disk and a back-up device (floppy disk or streaming tape drive).

The Operator Display Module 41 provides a keyboard and screen to enable an operator to input information and receive visual information.

While a single cell may comprise all of the above units, in the typical user application individual cells will normally be dedicated to specialized functions. For example, one or more mass storage cells may be set up to function as data base servers. There may also be several operator consoles and at least one cell for generating hard-copy printed output. Either these same cells, or separate dedicated cells, may execute particular application programs.

The system is particularly designed to provide an integrated solution for factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debugger, and performance-monitoring tools.

LOCAL AREA NETWORK

The local area network, as depicted in either FIG. 1 or FIG. 2, ties the entire system together and makes possible the distributed virtual machine model described below. The LAN provides high throughput, guaranteed response, reliability, and low entry cost. The LAN is also autonomous, in the sense that all system and applications software is unaware of its existence. For example, any Network Interface Module (e.g. NIM 21, FIG. 2) could be replaced without rewriting any software other than that which directly drives it.

The LAN interconnection medium may be twisted-pair or coaxial cable. Two channels (logically, two distinct networks) may be provided for reliability and for increased throughput.

The LAN architecture is a logical ring, in which an electronic "token" is constantly passed from cell to cell at high speed. The current holder of the token may use it to send a "frame" of data or may pass it on to the next cell in the ring. The NIM only needs to know the logical address and status of its immediately succeeding neighbor. The NIM's responsibility is limited to detecting the failure of that neighbor or the inclusion of a new neighbor. In general, adjustment to failed or newly added cells is automatic.

The network interface maps directly into the processor's memory. Data exchange occurs through a dual-ported buffer pool which contains a linked list of pending "frames". Logical messages, which vary in length, are broken into fixed-size frames for transmission and are reassembled by the receiving NIM. Frames are sequence-numbered for this purpose. If a frame is not acknowledged within a short period of time, it is retransmitted a number of times before being treated as a failure.

As described above with reference to FIG. 2, the LAN may be connected to other LAN's operating under the same LAN protocol via so-called "bridgeways", or it may be connected to other types of LAN's via "gateways".

SOFTWARE MODEL

The computer operating system of the present invention operates upon processes, messages, and contexts, as such terms are defined herein. Thus this operating system offers the programmer a hardware abstraction, rather than a data or control abstraction.

Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
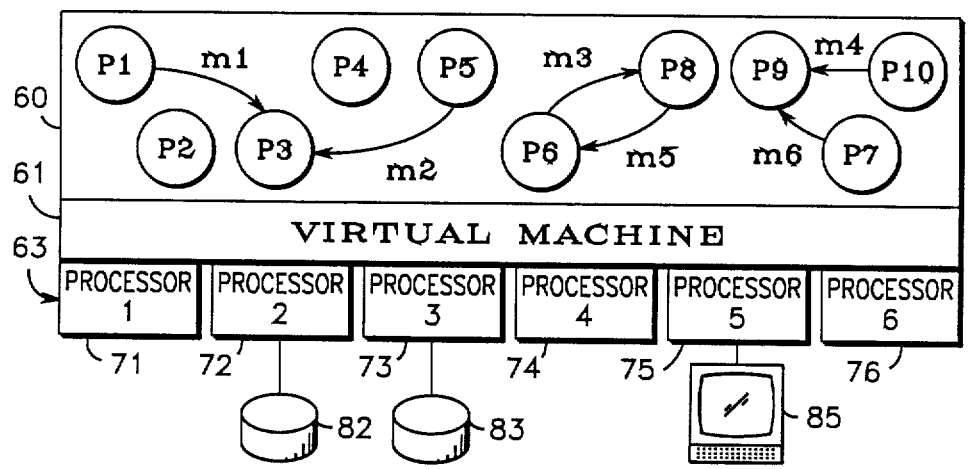
FIG. 3 shows an architectural model of a data processing system incorporating the present invention.

With reference to FIG. 3, an architectural model of the present invention is shown. The bottom, or hardware, layer 63 comprises a number of processors 71-76, as described above. The processors 71-76 may exist physically within one or more cells. The top, or software, layer 60 illustrates a number of processes P1-P10 which send messages m1-m6 to each other. The middle layer 61, labelled "virtual machine", isolates the hardware from the software, and it allows programs to be written as if they were going to be executed on a single processor. Conversely, programs can be distributed across multiple processors without having been explicitly designed for that purpose.

An important purpose of the virtual machine concept hereindisclosed is to provide the applications programmer with a simple, consistent model in which to design his system. This model, as mentioned above, is reduced to several elemental concepts: processes, messages, and contexts. As a consequence of this elemental model, hardware peculiarities are made transparent to the user, and changes in hardware configurations have no direct effect on the software.

THE VIRTUAL MACHINE

As discussed earlier, a "process" is a self-contained package of data and executable procedures which operate on that data. The data is totally private and cannot be accessed by other processes. There is no concept of shared memory within the present invention. Execution of a process is strictly sequential. Multiple processes execute concurrently and must be scheduled by the operating system. The processes can be re-entrant, in which case only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a "pointer" to a process.

Every process also has a "name" which is a variable-length string of characters assigned by the programmer. A name need not be unique, and this ambiguity may be used to add new services transparently and to aid in fault-tolerance.

Figure 4:
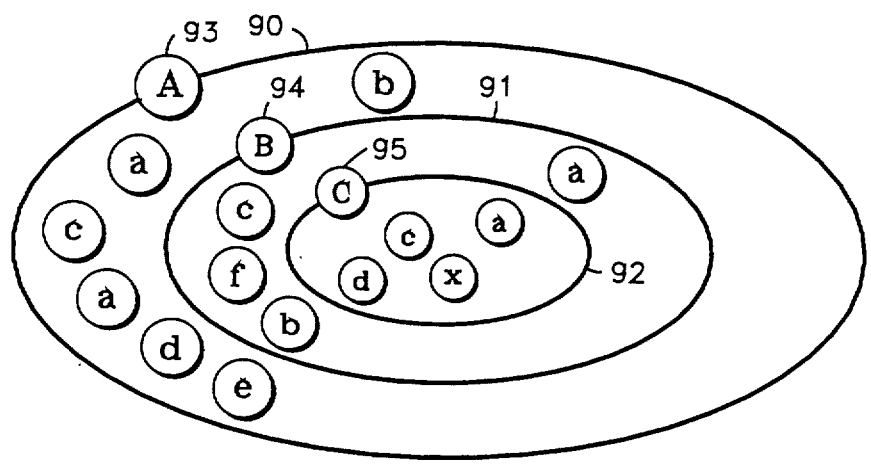
FIG. 4 shows the relationship between software contexts and processes as they relate to the present invention.

FIG. 4 illustrates that the system-wide name space is partitioned into distinct subsets by means of "contexts" identified by reference numerals 90–92. A context is simply a collection of related processes whose names are not known outside of the context. Context 90, for example, contains processes A, a, a, b, c, d, and e. Context 91 contains processes B, a, b, c, and f. And context 92 contains processes C, a, c, d, and x.

One particular process in each context, called the "context process", is known both within the context and within the immediately enclosing one (referred to as its "parent context"). In the example illustrated in FIG. 4, processes A–C are context processes for contexts 90–92, respectively. The parent context of context 91 is context 90, and the parent context of context 92 is context 91. Conceptually, the context process is located on the boundary of the context and acts as a gate into it.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context process is to filter incoming messages and either reject them or reroute them to other processes in its context. Contexts may be nested, allowing a hierarchy of abstractions to be constructed. A context must reside completely on one cell. The entire system is treated as an all-encompassing context which is always present and which is the highest level in the hierarchy. In essence, contexts define localized protection domains and greatly reduce the chances of unintentional naming conflicts.

If appropriate, a process inside one context can be "connected" to one inside another context by exchanging PID's, once contact has been established through one or the other of the context processes. Most process servers within the present invention function that way. Initial access is by name. Once the desired function (such as a window or file) is "opened", the user process and the service communicate directly via PID's.

A "message" is a variable-length buffer (limited only by the processor's physical memory size) which carries information between processes. A header, inaccessible to the programmer, contains the destination name and the sender's PID. By convention, the first field in a message is a null-terminated string which defines the type of message (e.g., "read", "status", etc.) Messages are queued to the receiving process when they are sent. Queuing ensures serial access and is used in preference to semaphores, monitors, etc.

As mentioned above, messages provide the mechanism by which hardware transparency is achieved. A process located anywhere in the virtual machine can send a message to any other process if it knows its name. Transparency applies with some restrictions across bridgeways (i.e., the interfaces between LAN's operating under identical network protocols) and, in general, not at all across gateways (i.e., the interfaces between LAN's operating under different network protocols) due to performance degradation. However, they could so operate, depending upon the required level of performance.

EXTERNAL INTERRUPTS AS MESSAGES

Figure 5:
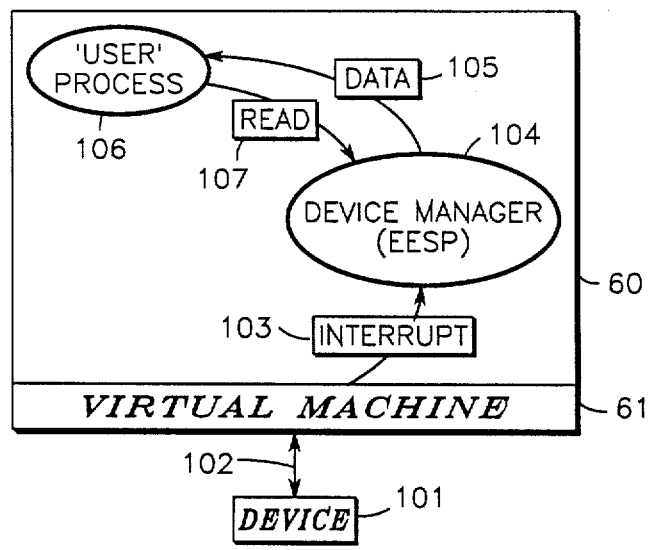
FIG. 5 shows the relationship between external events and processes.

Now with specific reference to FIG. 5, several features relating to the present invention will be discussed. FIG. 5 illustrates the relationship of external events to processes. As mentioned above, the virtual machine makes devices look like processes.

In FIG. 5, the exterior box 60 represents a portion of the entire data processing system, containing the virtual machine 61 and two typical processes 104 and 106. The arrows represent queued message transmissions, and they are overlaid with boxes 103, 105, and 107 representing typical messages.

For example, assume a user's process 106 issues a READ request for a particular device via its "external event service process" (EESP), functioning as the device manager (i.e., EESP 104). The external device generates a series of events which are noticed by the virtual machine which consequently queues "event" messages to the EESP 104. Eventually, an "end of line" event is generated. (These messages are queued along with other messages, from user processes, to the EESP 104.) As a result, a message containing a data record 105 is queued to the user's process 106.

Thus, the EESP performs all hardware-specific functions related to the event, such as setting control registers, moving data 105 to a user process 106, transmitting "Read" messages from the user process 106, etc., and then "releasing" the interrupt.

When an interrupt occurs in an external device 101, the virtual machine kernel 61 also queues an interrupt message 103 to EESP 104. For efficiency, the message is pre-allocated once and circulates between the EESP 104 and the kernel. The message contains just enough information to indicate the occurrence of the event.

To become an EESP, a process issues a "connect" primitive specifying the appropriate device register(s). It must execute a "disconnect" before it exits. Device-independence is achieved by making the message protocol between EESP's and applications processes the same wherever possible. In this manner a wide variety of different types of hardware devices can be accommodated without having to make extensive software revisions.

INTER-PROCESS COMMUNICATION

All inter-process communication is via messages. Consequently, most of the virtual machine primitives are concerned with processing messages. The virtual machine kernel primitives are the following:

ALLOC — requests allocation of a (message) buffer of a given size.

FREE — requests deallocation of a given message buffer.

PUT — send a message to a given destination (by name or PID).

GET — wait for and dequeue the next incoming message, optionally from a specific process (by PID).

FORWARD — pass a received message through to another process.

CALL — send a message, then wait for and dequeue the reply.

REPLY — send a message to the originator of a given message.

ANY_MSG — returns "true" if the receive queue is not empty, else returns "false"; optionally, checks if any messages from a specific PID are queued.

CONNECT — indicates willingness to accept a particular class of external events.

DISCONNECT — indicates stop accepting external events.

RELEASE — used by EESP's only to indicate completion of processing of a particular external event message.

To further describe the function of the kernel primitives, ALLOC handles all memory allocations. It returns a pointer to a buffer which can be used for local storage within the process or which can be sent to another process (via PUT, etc.). ALLOC never "fails", but rather waits until enough memory is freed to satisfy the request.

The PUT primitive queues a message to another process. The sending process resumes execution as soon as the message is queued.

FORWARD is used to quickly reroute a message but maintain information about the original sender (whereas PUT always makes the sending process the originator of the message).

REPLY sends a message to the originator of a previously received message, rather than by name or PID.

CALL essentially implements remote subroutine invocations, causing the caller to suspend until the receiver executes a REPLY. Subsequently, the replied message is dequeued out of sequence, immediately upon arrival, and the caller resumes execution.

The emphasis is on concurrency, so that as many processes as possible are executed in parallel. Hence neither PUT nor FORWARD waits for the message to be delivered. Conversely, GET suspends a process until a message arrives and dequeues it in one operation. The ANY_MSG primitive is provided so that a process may determine whether there is anything of interest in the queue before committing itself to a GET. The CONNECT, DISCONNECT, and RELEASE primitives are specifically used to handle external interrupts.

Figure 6:
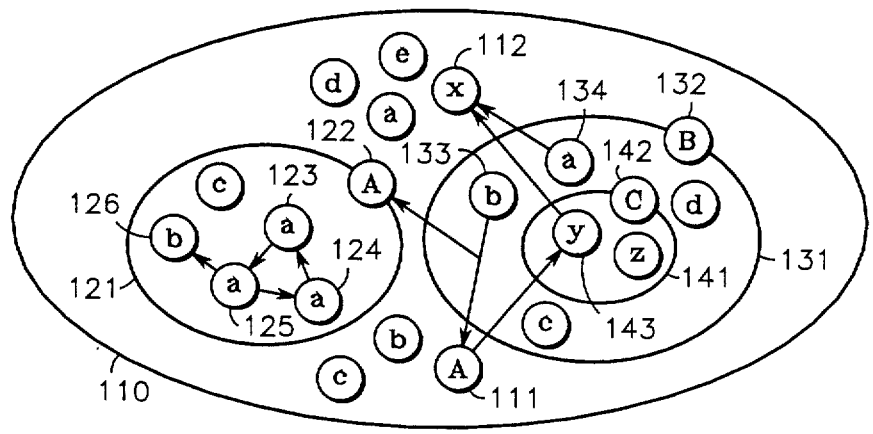
FIG. 6 shows how messages may be sent between processes within nested contexts.

When a message is sent by name, the destination process must be found in the name space. The search path is determined by the nesting of the contexts in which the sending process resides. From a given process, a message can be sent to all processes in its own context or (optionally) to those in any higher context. Refer to FIG. 6. the contexts are searched from the current one upward until a match is found or until the system context is reached. All processes with the same name in that context are then queued a copy of the message.

For example, with reference to FIG. 6, assume that in context 141 process y sends a message to ALL processes by the name x. Process y first searches within its own context 141 but finds no process x. The process y searches within the next higher context 131 (its parent context) but again finds no process x. Then process y searches within the next higher context 110 and finds a process x, identified by reference numeral 112. Since it is the only process x in context 110, it is the only recipient of the message from process y.

If process a in context 131 sends a message to ALL processes by the name x, it first searches within its own context 131 and, finding no processes x there, it then searches within context 110 and finds process x.

Assume that process b in context 131 sends a message to ALL processes by the name A. It would find process A (111) in context 110, as well as process A (122) which is the context process for context 121.

A process may also send a message to itself or to its context process without knowing either name explicitly.

The concept of a "logical ring" (analogous to a LAN) allows a message to be sent to the NEXT process in the system with a given name. The message goes to exactly one process in the sender's context, if such a process exists. Otherwise the parent context is searched.

The virtual machine guarantees that each NEXT transmission will reach a different process and that eventually a transmission will be sent to the logically "first" process (the one that sent the original message) in the ring, completing the loop. In other words, all processes with the same name at the same level can communicate with each other without knowing how many there are or where they are located. The logical ring is essential for distributing services such as a data base. The ordering of processes in the ring is not predictable.

For example, regarding FIG. 6, if process a (125) in context 121 sends a message to process a using the NEXT primitive, the search finds a first process a (124) in the same context 121. Process a (124) is marked as having received the message, and then process a (124) sends the message on to the NEXT process a (123) in context 121. Process a (123) is marked as having received the message, and then it sends the message on to the NEXT process a, which is the original sender process a (125), which knows not to send it further on, since it's been marked as having already received the message.

Sending messages directly by PID obviates the need for a name search and ignores context boundaries. This is known as the DIRECT mode of transmission and is the most efficient. For example, process A (111) sends a message in the DIRECT mode to process y in context 141.

If a process sends a message in the LOCAL transmission mode, it sends it only to a process having the given name in the sender's own context.

In summary, including the DIRECT transmission mode, there are five transmission modes which can be used with the PUT, FORWARD, and CALL primitives:

ALL — to all processes with the given name in the first context which contains that name, starting with the sender's context and searching upwards through all parent contexts.

LOCAL — to all processes with the given name in the sender's context only.

NEXT — to the next process with the given name in the same context as the sender, if any; otherwise it searches upwards through all parent contexts until the name is found.

LEVEL — sends to "self" (the sending process) or to "context" (the context process corresponding to the sender's context); "self" cannot be used with CALL primitive.

DIRECT — sent by PID.

Messages are usually transmitted by queueing a pointer to the buffer containing the message. A message is only copied when there are multiple destinations or when the destination is on another cell.

OPERATING SYSTEM

The operating system of the present invention consists of a kernel, which implements the primitives described above, plus a set of processes which provide process creation and termination, time management (set time, set alarm, etc.) and which perform cell start-up and configuration. Drivers for devices are also implemented as processes (EESP's), as described above. This allows both system services and device drivers to be added or replaced easily. The operating system also supports swapping and paging, although both are invisible to applications software.

Unlike known distributed computer systems, that of the present invention does not use a distinct "name server" process to resolve names. Name searching is confined to the kernel, which has the advantage of being much faster.

A minimal bootstrap program resides permanently (in ROM) on every cell, e.g. ROM 28 in cell N of FIG. 2. The bootstrap program executes automatically when a cell is powered up and begins by performing basic on-board diagnostics. It then attempts to find and start an initial system code module which comprises the entire kernel, and EESP's for the clock, disk (if required), and NIM (if required). The module is sought on the first disk drive on the cell, if any. If there isn't a disk, and the cell is on the LAN, a message will be sent out requesting the module. Failing that, the required software must be resident in ROM. System services for the clock and for process creation, an initialization program, and a minimal file system, are also built into the module. The initialization program sets up all of the kernel's internal tables and then calls predefined entry points in each of the preloaded services (file management, etc.). The net result is that EESP's for the attached devices are scheduled to run, and the cell is available.

In general, there exists a template file describing the initial software and hardware for each cell in the system. The template defines a set of initial processes (usually one per service) which are scheduled immediately after the cell start-up. These processes then start up their respective subsystems. A cell configuration service on each cell sends configuration messages to each subsystem when it is being initialized, informing it of the devices it owns. Thereafter, similar messages are sent whenever a new device is added to the cell or a device fails or is removed from the cell.

Thus there is no well-defined meaning for "system up" or "system down"—as long as any cell is active, the system as a whole may be considered to be "up". Cells can be shut down or started up dynamically without affecting other cells on the network. The same principle applies, in a limited sense, to peripherals. Devices which can identify themselves with regard to type, model number, etc. can be added or removed without operator intervention. The operating system cannot maintain a global status of the system, nor does it attempt to centralize control of the entire system.

DATA MANAGEMENT

The present invention allows the user to store and retrieve data at several levels of abstraction. At various levels it provides device-independence, transparency, multiple views of the same data and support for transaction processing. Transparency means that a process need not know where a file is stored in order to access it. It also means that the file can be moved to another device without affecting the process. Only as many levels as are required for a particular application need be included in the system.

Figure 7:
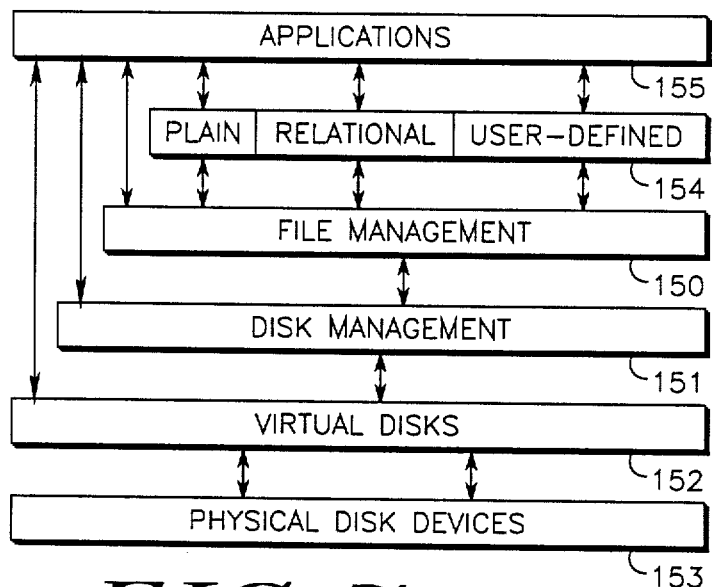
FIG. 7 shows an architectural model of the improved data management system incorporating the present invention.

Referring now to FIG. 7, the lowest level of data management is the physical disk layer 153, which is completely hidden from all applications software 155. Immediately above this level are virtual disks 152 which define an interface in terms of linear arrays of 1K blocks, regardless of the actual medium. Although the usual medium is disk, RAM may also be used (for temporary files) to improve performance. Three types of messages are supported at this level: "initial", to format the virtual disk, and "read" and "write" to access specific blocks.

The third level, disk management 151, organizes data within a virtual disk by means of indices. A disk index is a file at this level and is viewed as an extensible linear array of bytes. Messages are accepted to initialize the disk, allocate and delete indices, and read and write indices. The latter two functions operate starting at a given byte offset for a given byte length. An index is automatically extended when a request references a location outside the current limits. Physical storage is allocated only when data is actually written. Optional data caching is supported at the disk management level on a per cell basis.

File management 150 is layered on top of disk management 151 and introduces the concept of a "file system". A file system is a collection of named files (or named indices, in terms of the disk management layer 151). The name space constitutes a flat (single-level) directory which is allocated when the file system is initialized. A name may be up to 64 characters long and is hashed into the directory. Unnamed files are useful for building complex disk structures which are logically linked to each other, such as a hierarchical file directory or a database, or for temporary files which only the creator will use.

Transparency is supported only at the file management level 150 and above. It is used by simply omitting the file system name from the request (NEW, DELETE, RENAME, or OPEN). In this case, the request is forwarded through all file systems until the given file name is found.

The highest level 154 of data management deals in terms of "metaphors", which implement application-specific views of the data. A relational database is one example of a metaphor. Complex operations such as multi-user synchronization and record- or field-locking may be implemented at this level. The present invention supports two built-in views of the data: "plain" files, while are superficially equivalent to UNIX TM files, and a relational database.

Figure 8:
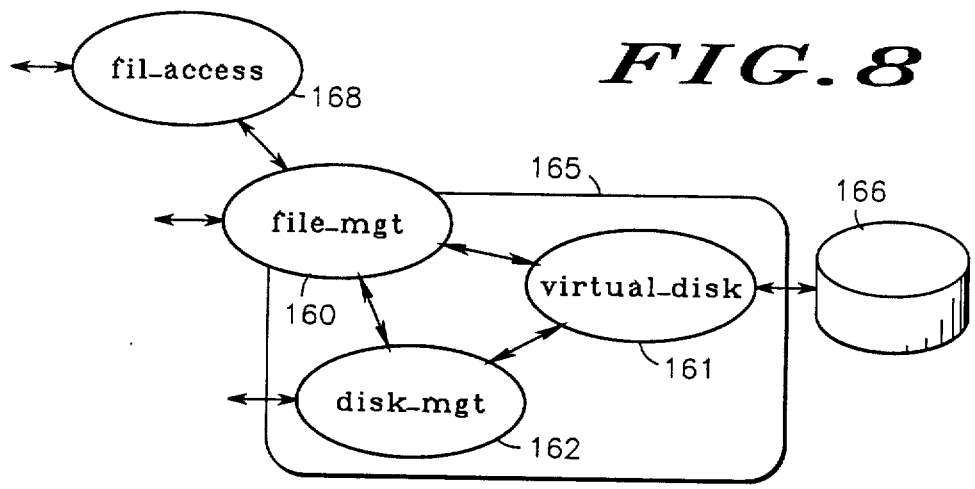
FIG. 8 shows an architectural software model of the improved data management system incorporating the present invention.

FIG. 8 illustrates the design of the data management software up to the plain-file level. Each active (mounted) file system 165 is represented by a file management context 160. The set of all such contexts forms a logical ring for purposes of message transmission; in other words, they all have the same name ("file_mgt"). The actual name of the file system (stored on the disk 166 at initialization) is known only to the context process.

In the plain-file metaphor, there is exactly one process for each open file, acting as a server for that file. That process (an instance of "fil_access") can be located in the appropriate file management context, or any application can create its own private copy of the process. The process allows standard file management functions (NEW, DELETE, RENAME, OPEN, and CLOSE) plus SEEK, LOCK (lock the entire file against access by processes other than the owner) and UNLOCK. Note that a given file process is only opened once, by its owner. If not locked, any other processes which know its name or PID can read and write the file. Protection is provided through normal process name-scoping. Protection via passwords or a similar mechanism are in general unsupported unless supported by another metaphor.

HUMAN INTERFACE

The human interface (HI) of the present invention provides a set of tools with which an end user can construct a package specific to his applications requirements. Such a package is referred to as a "metaphor", since it reflects the user's particular view of the system. Multiple metaphors can be supported concurrently. One representative metaphor is, for example, a software development environment.

The purpose of the HI metaphor is to allow consistent, integrated access to the data and functions available in the system. Since users' perceptions of the system are based largely on the way they interact with it, it is important to provide an interface with which they feel comfortable. The HI allows a systems designer to create a model consisting of objects that are familiar to the end user and a set of actions that can be applied to them.

The fundamental concept of the HI is that of the "picture". All visually-oriented information, regardless of interpretation, is represented by pictures. A picture (such as a diagram, report, menu, icon, etc.) is defined in a device-independent format which is recognized and manipulated by all programs in the HI and all programs using the HI. It consists of "picture elements", such as "line", "arc", and "text", which can be stored compactly and transferred efficiently between processes. All elements have common attributes like color and fill pattern. Most also have type-specific attributes, such as typeface and style for text. Pictures are drawn in a large "world" co-ordinate system composed of "virtual pixels".

Because all data is in the form of pictures, segments of data can be freely copied between applications, e.g., from a live display to a word processor. No intermediate format or conversion is required. One consequence of this is that the end user or original equipment manufacturer (OEM) has complete flexibility in defining the formats of windows, menus, icons, error messages, help pages, etc. All such pictures are stored in a library rather than being built into the software and so are changeable at any time without reprogramming. A comprehensive editor is available to define and modify pictures on-line.

All interaction with the user's environment is through either "virtual input" or "virtual output" devices. A virtual input device accepts keyboards, mice, light pens, analog dials, pushbuttons, etc. and translates them into text, cursor-positioning, action, dial, switch, and number messages. All physical input devices must map into this set of standard messages. Only one process, an input manager for the specific device, is responsible for performing the translation. Other processes can then deal with the input without being dependent on its source.

Figure 9:
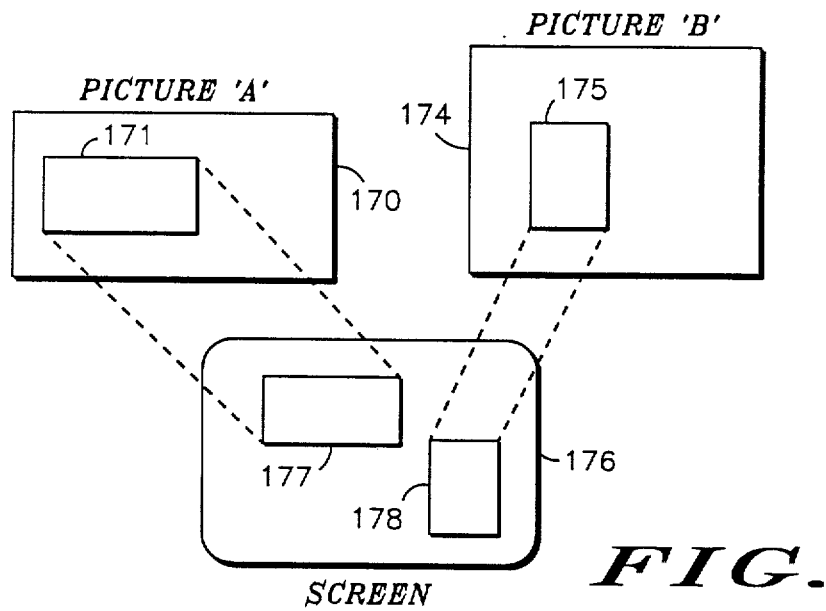
FIG. 9 shows the relationship between pictures, views, and windows in the human interface of a data processing system incorporating the present invention.

Similarly, a virtual output manager translates standard output messages to the physical representation appropriate to a specific device (screen, printer, plotter, etc.) A picture drawn on any terminal or by a process can be displayed or printed on any device, subject to the physical limitations of that device. With reference to FIG. 9, two "pictures" are illustrated—picture A (170) and picture B (174).

The concept of a "view" is used to map a particular rectangular area of a picture to a particular device. In FIG. 9, picture A is illustrated as containing at least one view 171, and picture B contains at least one view 175. Views can be used, for example, to partition a screen for multiple applications or to extract page-sized subsets of a picture for printing.

If the view appears on a screen it is contained in a "window". With reference again to FIG. 9, view 171 of picture A is mapped to screen 176 as window 177, and view 175 of picture B is mapped as window 178.

The HI allows the user to dynamically change the size of the window, move the window around on the screen, and move the picture under the window to view different parts of it (i.e., scroll in any direction). If a picture which is mapped to one or more windows changes, all affected views of that picture on all screens are automatically updated. There is no logical limit to the number or sizes of windows on a particular screen. Since the system is distributed, it's natural for pictures and windows to be on different cells. For example, several alarm displays can share a single, common picture.

The primary mechanism for interacting with the HI is to move the cursor to the desired object and "select" it by pressing a key or button. An action may be performed automatically upon selection or by further interaction, often using menus. For example, selecting an icon usually activates the corresponding application immediately. Selecting a piece of text is often followed by selection of a command such as "cut" or "underline". Actions can be dynamically mapped to function keys on a keyboard so that pressing a key is equivalent to selecting an icon or a menu item. A given set of cursors (the cursor changes as it moves from one application picture to another), windows, menus, icons, and function keys define a "metaphor".

The HI builds on the above concepts to provide a set of distributed services. These include electronic mail, which allows two or more users at different terminals to communicate with each other in real time or to queue files for later delivery, and a forms manager for data entry. A subclass of windows called "virtual terminals" provides emulation of standard commercially available terminals.

Figure 10:
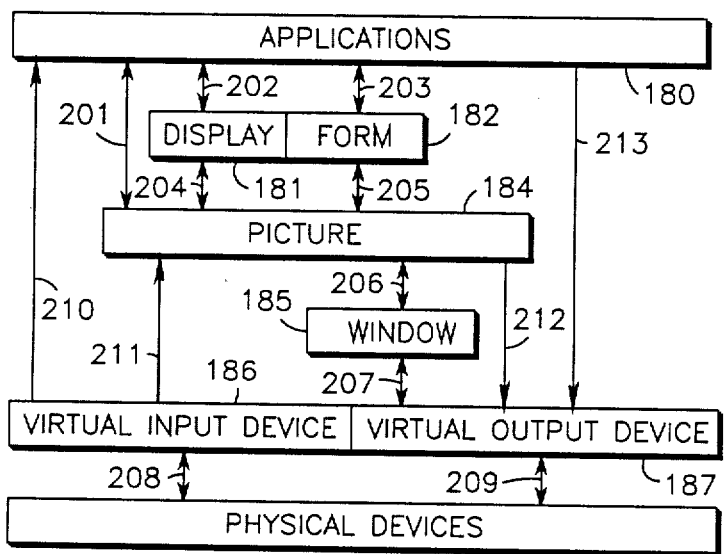
FIG. 10 shows a conceptual view of the different levels of human interface within a data processing system incorporating the present invention.

FIG. 10 shows the different levels of the HI and data flow through them. Arrows 201-209 indicate the most common paths, while arrows 210-213 indicate additional paths. The interface can be configured to leave out unneeded layers for customized applications. The philosophy behind the HI design dictates one process per object. That is, a process is created for each active window, picture, input or output device, etc. As a result, the processes are simplified and can be distributed across cells almost arbitrarily.

ERROR MANAGEMENT

An error management service is provided to catch errors and report them to the appropriate process(es). It serves as a foundation upon which more sophisticated diagnostics and/or recovery schemes may be constructed. The system can intercept processor internal exceptions (bus and address errors, "trap" instructions, etc.), external exceptions (such as spurious interrupts), device faults, and software-defined errors. The latter category is open-ended and comprises unexpected termination of a process, the result of a diagnostic program, or in general any error detected by the kernel or by any process. Failure to find the destination of a transmitted message is one example. While internal exceptions can be associated with the particular process which caused the error, external exceptions are independent, although they may directly impact one or more processes.

In summary, the prime functions of the error management service are to: (1) classify and log errors, (2) generate notification messages, (3) accept requests to configure the service and specify options, (4) accept software error messages from other subsystems, and (5) terminate affected processes, if required. Item (3) above allows applications and services to indicate that they want to know about specific errors or classes of errors. Options include automatic logging, automatic display on the operator's terminal, automatic suspension (for debugging) or abortion of the offending process, and automatic dumping of the process image to a file. The default actions, if no options have been specified, are termination, logging and display. Any outstanding request can be cancelled at any time.

The HI logging service provides the facility to store error messages in a chronological file, maintain a hardcopy log, and create a dynamic display of errors, ordered by time, priority, class, etc. The debugger is often invoked upon occurrence of a process error to examine the process' state for clues.

DETAILED DESCRIPTION OF THE INVENTION

Figure 11:
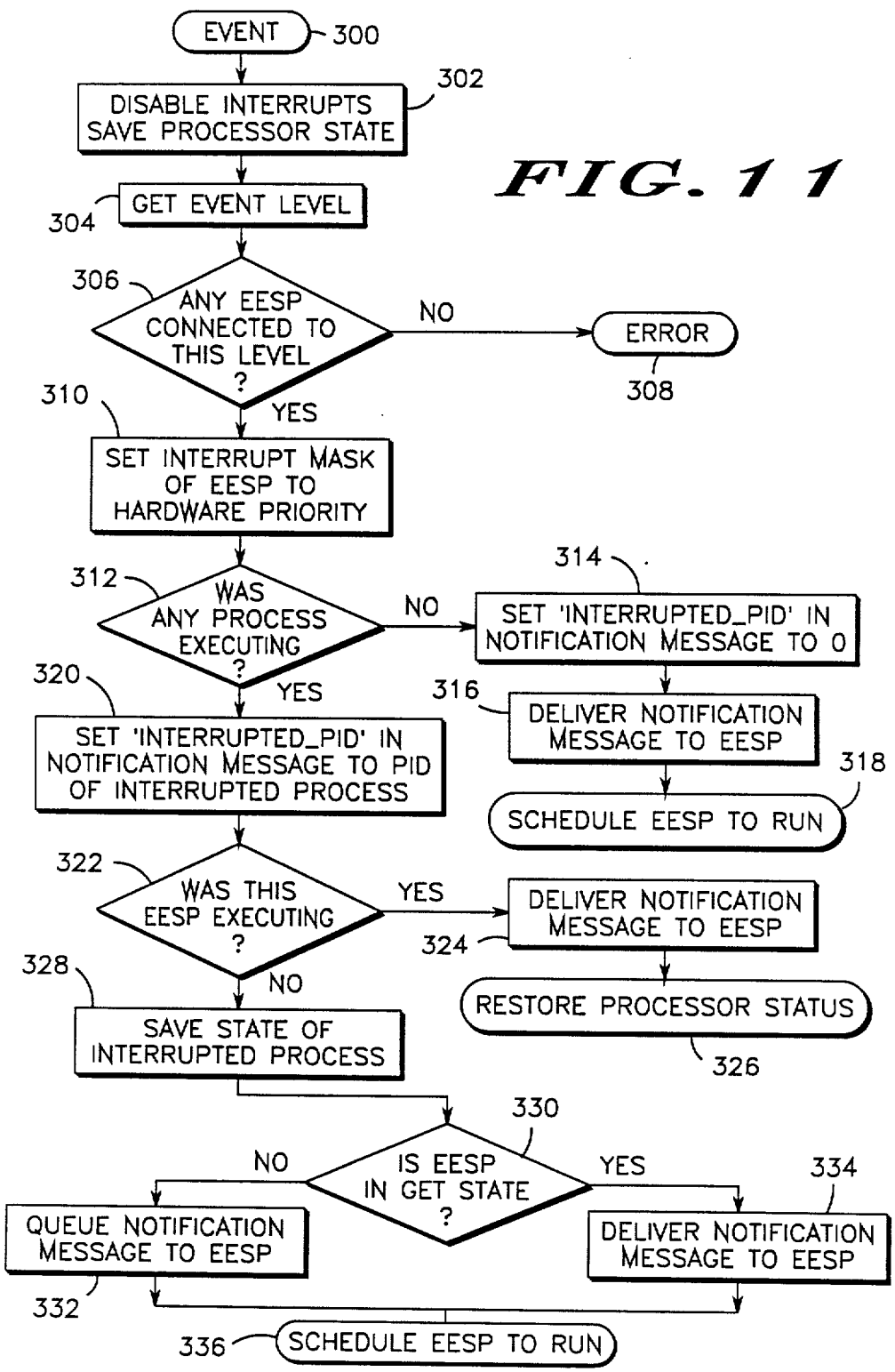
FIG. 11 shows a flow diagram illustrating how an interrupt event is handled by the data processing system of the present invention.

FIG. 11 shows a flow diagram illustrating how an interrupt event is handled by the data processing system of the present invention and will be discussed shortly.

Interrupt events may be either generated outside the virtual machine (e.g., by an operator keystroke) or inside the virtual machine (e.g., by a software trap or processor exception).

The virtual machine makes devices look like processes, in that the occurrence of an event on a device causes a message to be generated and sent to another process. The message contains just enough information to inform the receiving process of the event. The receiving process is expected to perform all hardware-specific operations related to the event, such as setting control registers, extracting data from buffers, etc. In other words, it performs the functions of a typical device "driver" or "handler".

Such processes, as mentioned above, are called External Event Service Processes or EESP's, from the virtual machine's point of view. To become an EESP, a process issues a CONNECT primitive to connect itself to the device; it must issue a DISCONNECT primitive before it exits. The event message is pre-allocated by the EESP during its initialization and is freed only after a DISCONNECT. The message circulates between the virtual machine and the EESP.

To the user, an EESP is usually accessed as a "device manager", which not only handles external events but also accepts requests to control and communicate with the device. If the device is quite complex, the manager will be a context, and the EESP will be a process in that context. The device manager filters external events and presents a uniform, device-independent interface to applications software.

OPERATION OF PREFERRED EMBODIMENT

With reference now to FIG. 11, the manner in which messages originating from hardware interrupts and exceptions are handled by the processor will be described.

Upon the occurrence of an Event 300, Interrupts are disabled and the processor state is saved (box 302). Next, in box 304 the event level is obtained using the GET primitive.

In decision box 306, if any EESP is already connected to this level, an error message is generated in box 308. If no EESP is already connected to this level, the procedure continues to box 310, where the interrupt mask of the EESP is set to hardware priority.

In decision box 312, if no process was executing, then the "interrupted_PID" field in the notification message is set to zero (box) 314), the notification message is delivered to the EESP (box 316), and the EESP is scheduled to run (box 318). If a process was executing (decision box 312), then set the "interrupted_*PID" field in the notification message to the PID of the interrupted process (box 320).

In decision box 322, if this EESP was executing, then deliver the notification message to the EESP (box 324), and restore the processor status (box 326). If this EESP was not executing, then save the state of the interrupted process (box 328).

In decision box 330, if this EESP is in the GET state, then deliver the notification message to the EESP (box 334), and schedule the EESP to run (box 336). Otherwise, queue the notification message to the EESP (box 332), and schedule the EESP to run (box 336).

DESCRIPTION OF PROGRAM LISTINGS

Program Listings A-F contain a "C" language implementation of the concepts relating to message transmission among processes in a data processing system incorporating the present invention. Program Listings C–E, in particular, describe the implementation of the innovative features of the present invention as set forth and described above.

In Program Listing C, lines 113–116, the data structure CT (Connection Table) is defined. Data structure CT is declared in Program Listing F, line 37. This table has an entry for every external event recognized by the system (including hardware interrupts, processor exceptions, software traps, etc.). Each entry contains a pointer to the PCB (Process Control Block) of the EESP (External Event Service Process) that issued a CONNECT kernel primitive for that event level, and a pointer to the external event occurrence notification message.

In Program Listing D, lines 29–49 describe the implementation of the CONNECT kernel primitive, whereby a process declares its readiness to accept external event occurrence notification messages, i.e., to become an EESP. It is here that the appropriate entry in the Connection Table is initialized with the PCB pointer and the notification message pointer.

In Program Listing D, lines 52–60 describe the implementation of the DISCONNECT kernel primitive, whereby a process ceases to receive notification messages for that event level. The appropriate entry in the Connection Table is cleared.

In Program Listing D, lines 62–68 describe the implementation of the RELEASE kernel primitive. This is used by an EESP to notify the kernel that the processing of the current external event is complete, and the process is ready to receive another event notification.

In Program Listing E, lines 471–552 describe the actual context switching and external event notification mechanism. This code, presented here in Motorola MC68010 assembly language, represents the implementation for the Motorola MC68010 microprocessor.

It will be apparent to those skilled in the art that the herein disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a message-based data processing system comprising a processor, a memory store comprising a plurality of processes, said processes communicating with each other by means of messages in a given message format, and a device within said system requiring interrupt-servicing a method of handling an interrupt generated by said device, said method comprising the steps of:

(a) generating an interrupt request when said device requires interrupt-servicing;

(b) providing an interrupt-servicing process within said memory store at a first address;

(c) providing an interrupt notification message within said memory store at a second address, said interrupt notification message being in said given message format;

(d) establishing a connection table within said memory store, said connection table comprising an entry containing said interrupt request, said first address, and said second address;

(e) responsive to the generation of said interrupt request, finding said entry in said connection table corresponding to said interrupt request; and (f) using said first and second addresses to send said interrupt notification message to said interrupt-servicing process.

2. The method of handling interrupts recited in claim 1, wherein said device is located within said processor.

3. The method of handling interrupts recited in claim 1, wherein said device is located within said memory store.

4. The method of handling interrupts recited in claim 1, wherein said system comprises a peripheral unit, and wherein said device is located within said peripheral unit.

5. The method of handling interrupts recited in claim 1, and further comprising the step of:

(g) using said interrupt-servicing process to control all operations required to be performed to service said interrupt request.

6. The method of handling interrupts recited in claim 1, and further comprising the step of:

(g) establishing said entry in said connection table by said interrupt-servicing process generating a connect primitive comprising information identifying said interrupt request, said first address, and said second address and storing said information in said table.

7. The method of handling interrupts recited in claim 6, and further comprising the step of:

(h) deleting said entry in said connection table by said interrupt-servicing process generating a disconnect primitive comprising information identifying said interrupt request, said first address, and said second address and deleting said information from said table.

8. The method of handling interrupts recited in claim 1, and further comprising the step of:

(g) generating a notification message by said interrupt-servicing process when it has completed servicing said interrupt.

* * * * *